United States Patent [19]

Takeshima et al.

[11] Patent Number: 5,534,992
[45] Date of Patent: Jul. 9, 1996

[54] OPTICAL MEASURING APPARATUS

[75] Inventors: Akira Takeshima; Musubu Koishi; Yoshihisa Warashina; Yoshihiko Mizushima, all of Hamamatsu, Japan

[73] Assignee: Hamamatsu Photonics K.K., Hamamatsu, Japan

[21] Appl. No.: 298,554

[22] Filed: Aug. 30, 1994

[30] Foreign Application Priority Data

Aug. 30, 1993 [JP] Japan .................... 5-214199

[51] Int. Cl.$^6$ .................... G01C 3/08
[52] U.S. Cl. .................... 356/5.1; 356/5.09
[58] Field of Search .................... 356/5.09, 5.1, 356/5.11, 5.12

[56] References Cited

U.S. PATENT DOCUMENTS

| | | | |
|---|---|---|---|
| 3,602,594 | 8/1971 | Cook et al. .................... | 356/5 |
| 3,649,123 | 3/1972 | Ulicki . | |
| 4,715,706 | 12/1987 | Wang .................... | 356/5 |
| 5,097,476 | 3/1992 | Thiessen . | |
| 5,115,294 | 5/1992 | Sudbo et al. . | |

FOREIGN PATENT DOCUMENTS

| | | |
|---|---|---|
| 0091665 | 10/1983 | European Pat. Off. . |
| 60-195479 | 10/1985 | Japan . |
| 60-262081 | 12/1985 | Japan . |
| 4-62491 | 2/1992 | Japan . |

OTHER PUBLICATIONS

"Rangefinders", Research Disclosure, No. 252, Apr. 1, 1985, Emsworth, Hampshire, Great Britain, pp. 187–189.

Baustert et al, "Electromagnetic Interference at Electrooptical Interfaces", Ire Wescon Convention Record, No. 32, Nov. 1, 1988, North Hollywood, US, pp. 1–7 XP99212.

Sugeta, et al: "Metal–Semiconductor–Metal Photodetector for Hihg–Speed Optoelectronic Circuits", Japanese Journal of Applied Physics, vol. 19 (1980), supplement 19–1, pp. 469–464.

Ito et al: "Low Dark Current GaAs Metal–Semiconductor––Metal (MSM) Photodiodes Using $WSi_x$ Contacts", IEEE Journal of Quantum Electronics, vol. QE–22, No. 7, Jul. 1986, pp. 1073–1077.

Primary Examiner—Mark Hellner
Attorney, Agent, or Firm—Cushman Darby & Cushman

[57] ABSTRACT

Laser light from LD (laser diode) is guided through a fiber to be projected onto a reflector. A receiver detects a return beam of modulated light reflected by the object and outputs a signal reflecting a phase difference between the laser light and the modulation signal. The frequency of the modulation signal is changed based on the signal value so as to finally achieve phase lock. When the phase lock fixes the frequency of the modulation signal, the frequency always corresponds to a distance from LD to the reflector or a group index of a substance filling the optical path. Thus, the distance to the object or the group index of the substance filling the optical path at the time of phase lock can be determined in a simple manner and with a high accuracy, based on the output frequency at the time of phase lock.

13 Claims, 11 Drawing Sheets

SCHEMATIC LAYOUT (1) OF THE INVENTION

SINE WAVE

TRIANGULAR WAVE

TRAPEZOID WAVE

RECTANGULAR WAVE

LAYOUT EXAMPLE 2 OF RECEIVER

OPTICAL MEASURING APPARATUS

BACKGROUND OF THE INVENTION

1. Field of the Invention

The present invention relates to an optical measuring apparatus for accurately measuring a distance to a target object or a group index of an optical path, using optical techniques.

2. Related Background Art

As a conventional rangefinder there is an ultrasonic rangefinder which cannot present high-accuracy results but only can serve as a rough guide. Namely, a problem was that a measuring position could not be finely determined, because there were difficulties in fully converting a beam and specifying a beam-focused position. Another problem was an inability to achieve a satisfactory measurement accuracy, because of the high degree of temperature dependence in the measurement.

As an optical rangefinder there exists an electro-optical rangefinder of a phase-difference method, in which the intensity of signal light is modulated by a sine wave or the like, the signal light is projected onto a target object, a phase of the modulation signal between transmission and reception is measured from a sinusoidal intensity change of reflected light, and a distance is determined based on the phase. Such a rangefinder, however, had a problem that a circuit system therefor became complex and expensive.

As a group index meter there also exists an electro-optical rangefinder of the phase-difference method, in which the intensity of signal light is modulated by a sine wave or the like, the signal light is projected onto a reflector grounded at a known distance, a phase of the modulation signal between transmission and reception is measured from a sinusoidal intensity change of reflected light, and a group index of a substance filling the optical path is determined based on the phase. The rangefinder of this type, however, had a problem that a circuit system therefor became complex and expensive.

SUMMARY OF THE INVENTION

The present invention has been accomplished to solve the above problems. It is an object of the present invention to provide an optical measuring apparatus for measuring a distance to a target object in a simple manner and with a high accuracy.

It is another object of the present invention to provide an optical measuring apparatus for measuring a group index of an optical path in a simple manner and with a high accuracy.

To solve the above problems, a first optical measuring apparatus of the present invention is arranged to have (a) a light-transmitting portion for projecting modulated light obtained by intensity-modulating a light carrier toward a target object, (b) a light-receiving portion for receiving reflected, modulated light reflected by the target object and returning thereto and a voltage signal reflecting a waveform of a modulation signal used to intensity-modulate the light carrier, directly calculating a product between the reflected, modulated light and the voltage signal, time-averaging the calculation result, and outputting a signal according to a value of a phase difference between the reflected, modulated light and the voltage signal, (c) frequency adjusting means for adjusting a frequency of the modulated light so as to keep a condition for an output signal from the light-receiving portion to be fixed at a reference value, (d) frequency counting means for counting the modulation frequency fixed after being adjusted by the frequency adjusting means, and (e) processing means for obtaining a distance from the light-transmitting portion and the light-receiving portion to the target object, based on the frequency counted by the frequency counting means.

Further, a second optical measuring apparatus of the present invention is arranged to have (a) a light-transmitting portion for projecting modulated light obtained by an intensity-modulating light carrier, (b) reflecting means disposed at a position of a predetermined distance from the light-transmitting portion, for reflecting the modulated light from the light-transmitting portion, (c) a light-receiving portion for receiving reflected, modulated light reflected by the target object and returning thereto and a voltage signal reflecting a waveform of a modulation signal used to intensity-modulate the light carrier, directly calculating a product between the reflected, modulated light and the voltage signal, time-averaging the calculation result, and outputting a signal according to a value of a phase difference between the reflected, modulated light and the voltage signal, (d) frequency adjusting means for adjusting a frequency of the modulated light so as to keep a condition for an output signal from the light-receiving portion to be fixed at a reference value, (e) frequency counting means for counting the modulation frequency fixed after adjusted by the frequency adjusting means, and (f) processing means for obtaining a group index of an optical path between the light-transmitting portion and light-receiving portion, and the reflecting means, based on the frequency counted by the frequency counting means.

In addition to the above arrangements, the optical measuring apparatus of the present invention can be so arranged that the apparatus is provided with a calibration bypass optical path for removing a phase difference intrinsic to the optical measuring apparatus itself or with a delay unit for providing the modulation signal output from the frequency adjusting means with a time delay to supply the resultant signal to the light-transmitting portion.

The light-receiving portion may comprise (1) a photoconductive receiver for receiving a light signal, to which a voltage reflecting a waveform of the modulation signal is applied, and (2) time-averaging means for receiving an output current from the photoconductive receiver and calculating a time average of values of the output current signal, or may further comprise (3) adjusting means for adjusting an offset voltage of the photoconductive receiver.

The photoconductive receiver may be so arranged that if a quantity of the projected light is constant and a value of the applied voltage is an independent variable, in a predetermined definition region including the value of applied voltage being 0 V an amount of a current flowing in the photoconductive receiver is an odd function of the applied voltage and the applied voltage is periodic, a value of time average thereof is approximately 0, and an amplitude thereof is an even function of time with the origin at a time of an intermediate point between two adjacent times having an amplitude of 0. For example, the photoconductive receiver may be a metal-semiconductor-metal photodetector.

Further, the voltage signal supplied to the light-receiving portion may be produced by phase-modulating the modulation signal with another modulation signal.

The frequency adjusting means may be arranged to comprise (1) an error amplifier for receiving a reference voltage and an output signal from the light-receiving portion, amplifying a value of a difference between a value of the reference voltage and a value of the output signal from the light-receiving portion, and outputting an amplified voltage signal, (2) a low-pass filter for receiving the amplified voltage signal, reducing an ac component, and outputting a near dc voltage signal, and (3) a voltage control oscillator for receiving the near dc voltage signal, producing an electric signal of a frequency according to a value of the voltage signal, and outputting the electric signal to the light-transmitting portion. The frequency adjusting means may be arranged to comprise (1) an error amplifier for receiving a reference voltage and an output signal from the light-receiving portion, amplifying a value of a difference between a value of the reference voltage and a value of the output signal from the light-receiving portion, and outputting an amplified voltage signal, (2) a low-pass filter for receiving the amplified voltage signal, reducing an ac component, and outputting a first near dc voltage signal, (3) first signal converting means for receiving the first near dc voltage signal and a voltage range instruction signal, and outputting a first near dc electric signal having a value according to a value of a product between a value of the first near dc voltage signal and a value of the voltage range, (4) second signal converting means for receiving displacement voltage instruction signal and outputting a second near dc electric signal having a value according to a value of the displacement voltage instruction signal, (5) signal adding means for receiving the first near dc electric signal and the second near dc electric signal and outputting a second near dc voltage signal according to a value of a sum between a value of the first near dc electric signal and a value of the second near dc electric signal, and (6) a voltage control oscillator for receiving the second near dc voltage signal output from the signal adding means, producing a signal of a frequency according to a value of the voltage signal, and outputting the signal to the light-transmitting portion.

Since the above optical measuring apparatus comprise the frequency adjusting means for adjusting the frequency of the modulated light so as to maintain the condition of phase lock that a difference between the phase of the modulation signal and the phase of the reflected, modulated light in the light-receiving portion is constant, the frequency of the modulation signal is always associated with a distance from the light-transmitting portion and light-receiving portion to the target object or a group index of the optical path. Accordingly, based on the frequency of the modulation signal at the time the frequency of the modulation signal is fixed, the distance to the target object or the group index of the optical path at this moment can be obtained in a simple manner and with a high accuracy.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

The principle of the present invention is first specifically described before describing specific embodiments of the present invention.

Figure 1:
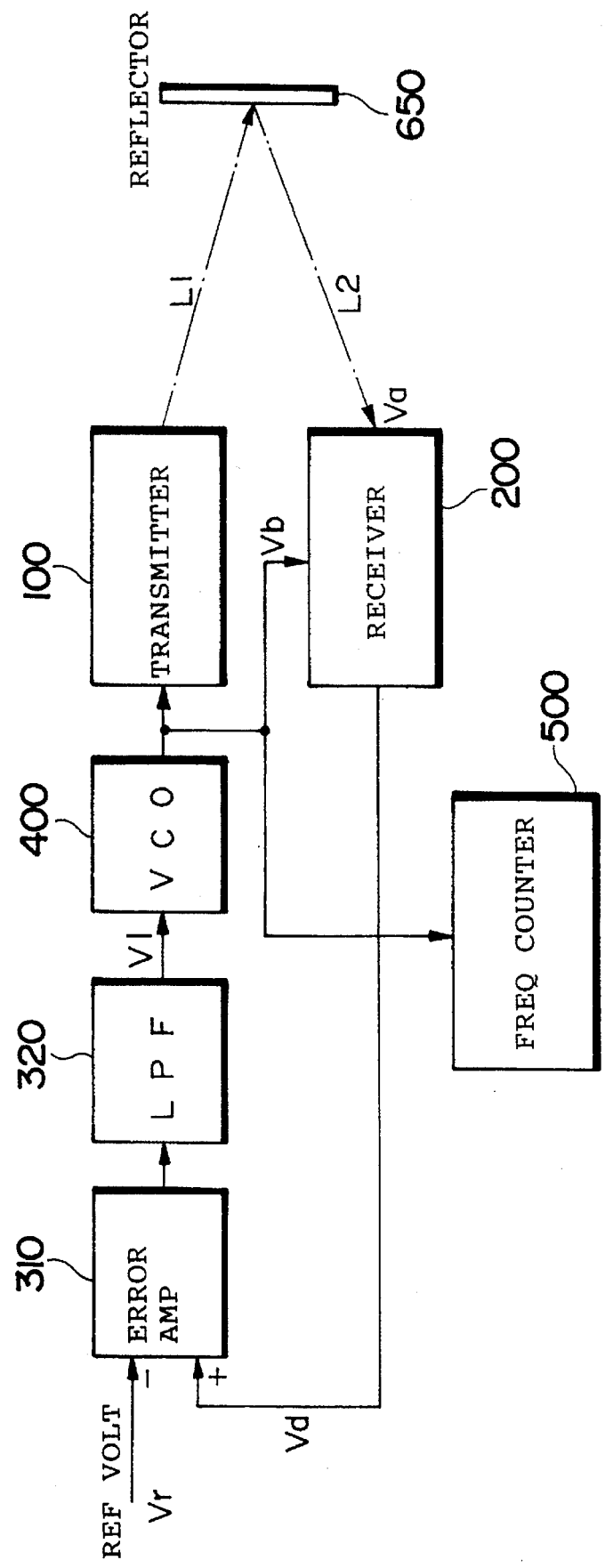
FIG. 1 is a structural drawing to show a schematic arrangement of an optical measuring apparatus of a first type according to the present invention.

FIG. 1 shows a schematic arrangement of an optical measuring apparatus of a first type according to the present invention. An error amplifier 310 is so arranged that a reference voltage ($V_r$) is applied to one input terminal thereof while a voltage signal ($V_d$) to another input terminal. The error amplifier 3 amplifies a difference ($V_d-V_r$) between a value of the voltage signal ($V_d$) and a value of the reference voltage ($V_r$) to output an amplified voltage, $V_f=G \cdot (V_d-V_r)$. The output from the error amplifier 310 is supplied to a low-pass filter 320. The low-pass filter 320 selects only a DC component from the output from the error amplifier 310 to determine transient response performance of a loop. An output from the low-pass filter 320 supplies a control voltage to a voltage control oscillator (VCO) 400. The VCO 400 oscillates at a frequency according to the control voltage supplied from the error amplifier 310 through the low-pass filter 320. An electric signal from the VCO 400 is supplied to a light-transmitting portion (transmitter) 100. The transmitter 100 is provided with a light source such as a laser diode (LD). The transmitter 100 intensity-modulates output light from the light source in accordance with the electric signal output from the VCO 400 and projects the modulated light toward a reflector (reflecting plate 650) in the form of a collimated beam. A reflected beam of the modulated light from the reflector (reflected, modulated light) is received by a light-receiving portion (receiver) 200. The receiver 200 also receives a modulation signal output from the VCO 400, and calculates a phase difference between the reflected, modulated light and the modulation signal. Then the receiver 200 calculates a time average voltage value of the phase-difference signal and outputs it. The time average voltage value is supplied to an input terminal of the error amplifier 310. A frequency counter 500 detects a frequency of the modulation signal output from the VCO 400. The frequency counter 500 may be replaced by another device which can measure the frequency. For example, possible devices are a combination of a frequency-voltage converter (F/V converter) and a voltmeter, a combination of a rate meter to output a voltage proportional to a repeat cycle of pulses and a voltmeter, and a frequency discriminator as used in a FM wave detector.

Figure 2:
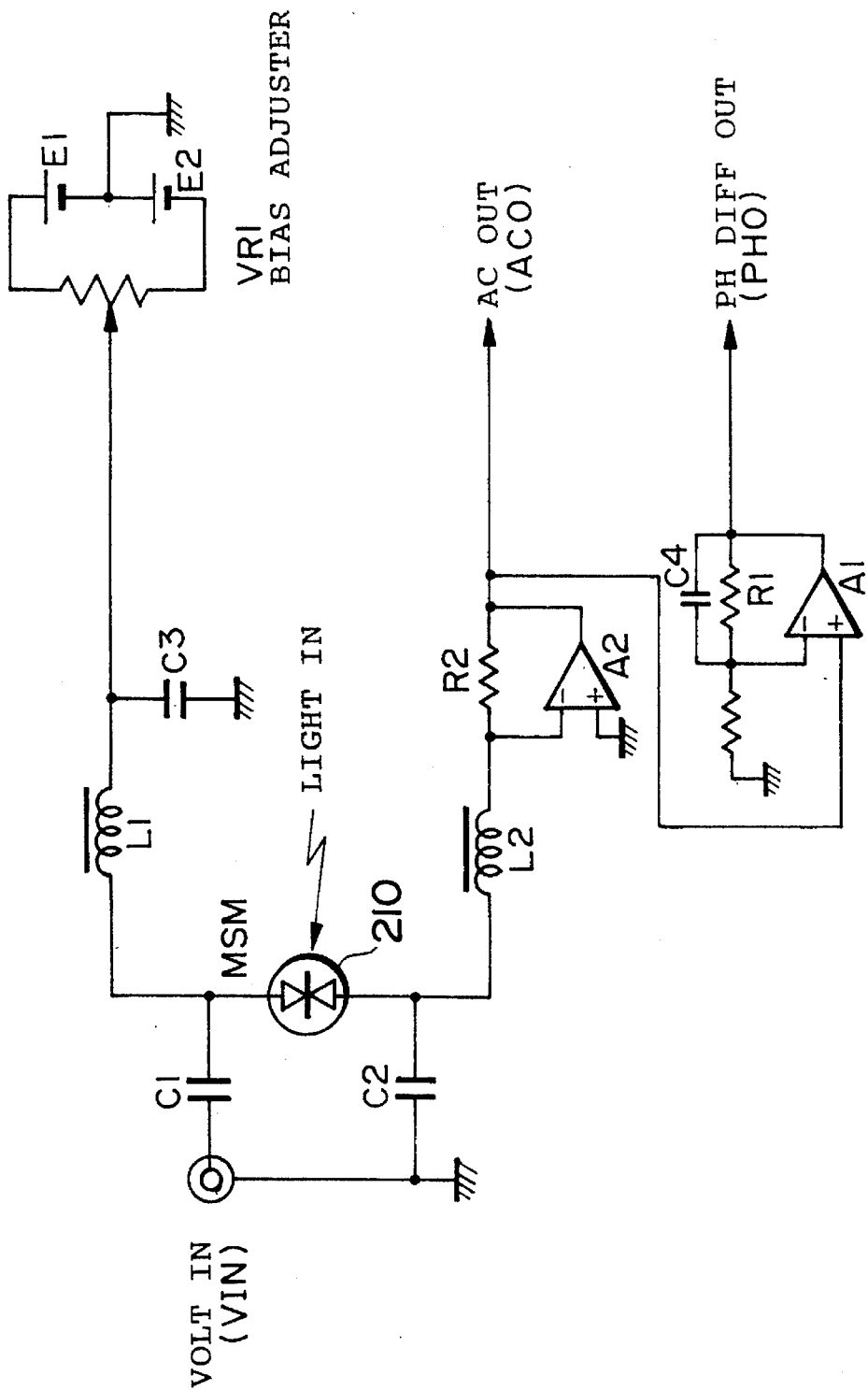
FIG. 2 is a structural drawing to show layout example 1 of a light-receiving portion.

The receiver 200 directly multiplies the light wave with the electric wave input thereinto, and outputs a low-frequency component of the multiplication result as a voltage value. FIG. 2 is a structural drawing to show layout example 1 of the receiver to achieve the function. The receiver is composed of a photoconductive receiver 210 for receiving the reflected, modulated light and the modulation signal and calculating a product between the reflected, modulated light as a light signal and the modulation signal as an electric signal to output an electric signal reflecting a phase difference between the reflected, modulated light and the modulation signal, junction capacitors C1, C2 for applying a voltage signal of an ac component of the modulation signal to the photoconductive receiver 210, choke coils L1, L2 for letting a dc component of a current generated in the photoconductive receiver 210 pass, an operational amplifier A2 and a resistor R2 for converting the ac component of the current signal flowing through the choke coil L1, the photoconductive receiver 210, and the choke coil L2 into a voltage, an operational amplifier A1, a capacitor C4, and a resistor R1 for calculating a time average of the thus converted voltage signal, and a bias adjuster for adjusting a bias value of the voltage applied to the photoconductive receiver 210.

The photoconductive receiver 210 is constructed of a metal-semiconductor-metal (MSM) receiver. The bias adjuster is composed of a variable resistor VR1 for adjusting the bias voltage value, and dc power supplies E1, E2 connected in series with each other and with associated terminals of the variable resistor VR1 while a junction between the dc supply E1 and the dc supply E2 is set at the ground potential.

In the receiver 200 the bias voltage is so adjusted through the variable resistor VR1 that the output becomes "0 V" upon reception of non-modulated light. In this case, ignoring fluctuations of the air, the ac component $V_a$ of the reflected, modulated light and the modulation signal $V_b$, which are the input signals into the receiver 200, can be expressed as follows.

$$V_a = V_A \sin(\omega t - \Phi) \quad (1)$$

where $V_A$: intensity amplitude of the reflected, modulated light (modulation component);

$\omega$: modulation frequency;

$\Phi$: phase difference between the reflected, modulated light and the modulation signal.

$$V_b = V_B \sin(\omega t) \quad (2)$$

where $V_B$: voltage amplitude of the modulation signal. The output voltage $V_d$ from the receiver 200 is expressed by the following formula.

$$\begin{aligned} V_d &= \langle V_a \cdot V_b \rangle \quad (3)\\ &= \langle K_1 \cdot V_A \sin(\omega t - \Phi) \cdot V_B \sin(\omega t) \rangle \\ &= \langle K_2 \cdot V_A \cdot V_B(\cos(2\omega t - \Phi) + \cos\Phi) \rangle \\ &= K_2 \cdot V_A \cdot V_B \cdot \cos\Phi \end{aligned}$$

where $\langle X \rangle$: time average of X;

$K_i$: constants (i=1, 2)

Figure 3:
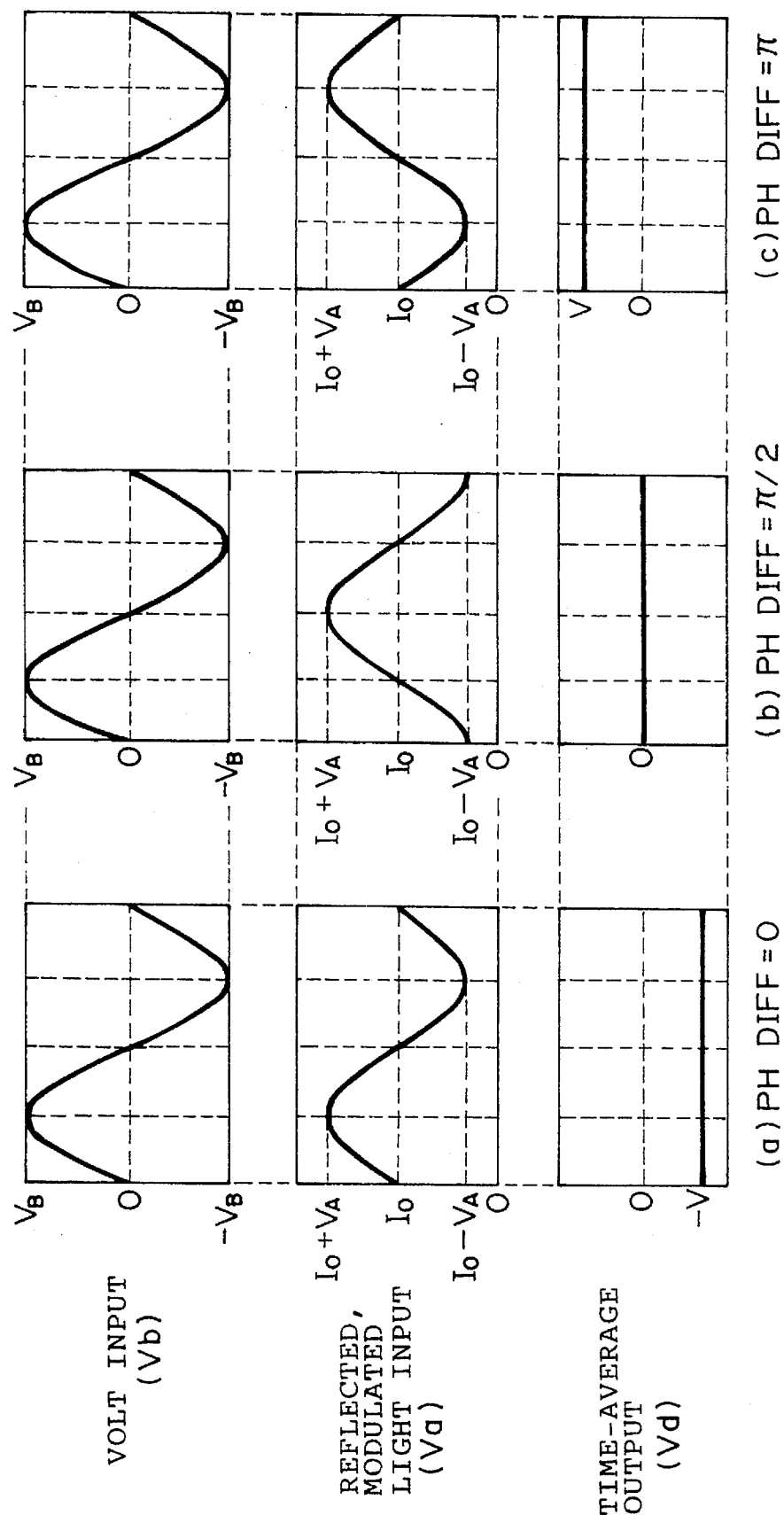
FIG. 3 is an explanatory drawing to show the operation of the light-receiving portion.
Figure 4:
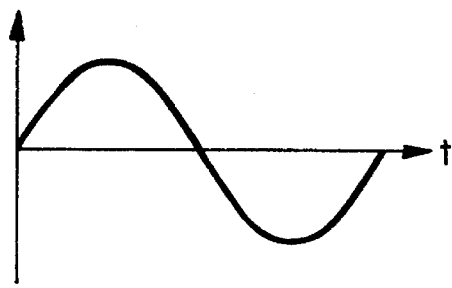
FIGS. 4 to 7 are explanatory drawings to show waveforms of modulation signals.
Figure 5:
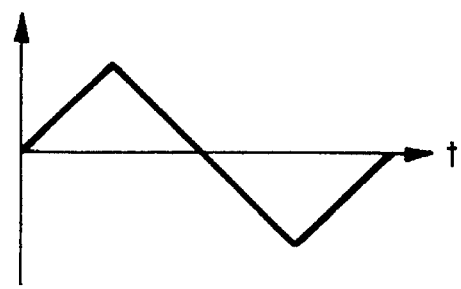
Figure 6:
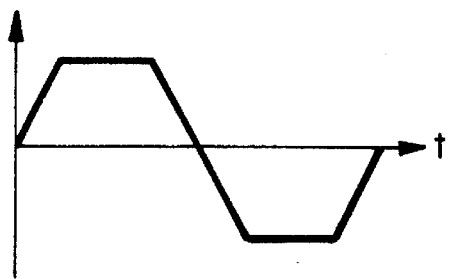
Figure 7:
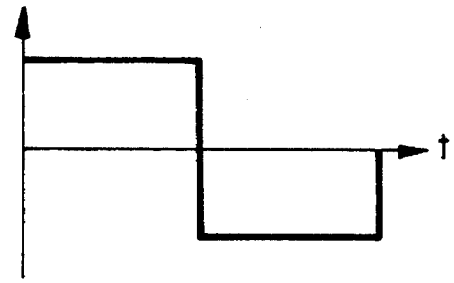

FIG. 3 is an explanatory drawing of the operation of the receiver to show a relation between the phase difference ($\Phi$) in formula (1) and the output voltage ($V_d$). In FIG. 3, (a) represents a case where the phase difference is 0 ($+2n\pi$; n=integers), (b) a case where the phase difference is $\pi/2$ ($+n\pi$; n=integers), and (c) a case where the phase difference is $\pi$ ($+2n\pi$; n=integers).

If the input value is "0 V" at the reference voltage terminal of the error amplifier 310, the output voltage value $V_f$ of the error amplifier 310 is.

$$V_f = G \cdot V_d = G \cdot K_2 \cdot \cos\Phi \quad (4)$$

where

G: gain of the error amplifier. Namely, $$\cos\Phi = V_f/(G \cdot K_2) \quad (5).$$

If the error amplifier 310 has a sufficiently large gain (that is, if G is large enough), such a phase-locked loop (PLL) can be constructed that the phase difference between the reflected, modulated light and the modulation signal is always approximately $\pi/2$(+n$\pi$; n=integers). Then the VCO 400 oscillates at a frequency according to a go-and-return distance (L1+L2) to a reflector.

It is noted that the modulation frequency value cannot be uniquely determined even if the lock condition of the PLL is established. Then, the range of oscillation frequencies of the VCO 400 is preliminarily arranged to include a period 4/3 times longer than a delay time (Td) of the go-and-return distance. If the initial modulation frequency is sufficiently low, the phase difference becomes just $\pi/2$ when the VCO 400 oscillates at the frequency, 4/3 times Td.

Thus, the group delay time Td corresponding to the go-and-return distance can be calculated by the following formula from the oscillation frequency of the VCO 400, i.e., from a measured value f by the frequency counter 500.

$$Td = 3/4 \cdot f^{-1} \quad (6)$$

where f: VCO oscillation frequency.

Accordingly, assuming a group index of a substance filling the optical path is already known and L1 is equal to L2 (L1=L2=L), a distance L from Td to the reflector can be calculated as follows.

$$L = c \cdot Td/(2 \cdot n) \quad (7)$$

where n: group index of the substance filling the optical path;

c: speed of light in vacuum.

Since a measurement accuracy of frequency is normally as high as six or more figures, the distance can also be determined at a high accuracy. The VCO 400 is so arranged that the oscillation frequency range is selected depending upon the range of distances to be measured.

Further, assuming L1 and L2 are equal to each other (L1=L2=L) and are already known, the group index n of the substance filling the optical path can be determined by the following formula from Td.

$$n = c \cdot Td/(2 \cdot L) \quad (8)$$

where
- n: group index of the substance filling the optical path;
- c: speed of light in vacuum.

Since the measurement accuracy of frequency is normally as high as six or more figures, the group index can also be determined at a high accuracy. The VCO 400 is so arranged that the oscillation frequency range is selected depending upon the range of distances to be measured.

Suppose the above optical rangefinder is used in the air. A change in quantity of received light due to fluctuations of the air causes a timing change (jitter) of the circuit system, which becomes dominant in variations of measured value. The effect on the change, however, can be minimized as long as the phase difference of π/2 is kept fixed. The receiver 200 employed herein, which is a phase comparator, works as a multiplier, so that in case of inputs of a same frequency shifted π/2 in phase to each other, the dc component (phase-difference information) of the output becomes zero irrespective of variations of amplitude. Taking the time dependence into consideration, the reflected, modulated light $V_a'$ as the input signal into the receiver 200 can be expressed as follows.

$$V_a'(t) = I_0 \cdot V_0(t) + V_A \cdot V_1(t) \cdot \sin(\omega t - \Phi) \quad (9)$$

where $V_0(t)$: time change of background light of the reflected, modulated light;

$V_1(t)$: time change of modulation component of the reflected, modulated light.

Generally, frequency components of the time changes of $V_0(t)$ and $V_1(t)$ are sufficiently smaller than the modulation signal frequency.

Unless the photoconductive receiver 210 is saturated, the output voltage $V_d$ of the receiver 200 becomes as follows.

$$V_d = \langle V_a'(t) \cdot V_b \rangle = K_2 \cdot V_A \cdot V_B \cdot \cos \Phi \cdot \langle V_1(t) \rangle \quad (10)$$

If the phase difference Φ is πK/2, $V_d=0$ regardless of the mode of $V_1(t)$. Namely, a control to keep the phase difference of Φ=π/2 can avoid the effect of intensity change of the reflected, modulated light.

FIGS. 4 to 7 are explanatory drawings to show various modulation signals. The above description concerned the example employing the sine wave of FIG. 4 as the modulation signal, but the modulation signal may have another waveform. Applicable waveforms of the modulation signal can be determined as follows in the time-amplitude coordinate system: (1) The signal is a periodic function having a constant period; (2) the time average of the amplitude is "0"; and (3) with the origin at the center between two adjacent times having the amplitude of zero, the amplitude is an even function of time. With waveforms satisfying these conditions, the output from the receiver 200 becomes "0 V" when the phase difference is one-quarter period, similarly as in the above example. Namely, applicable waveforms are, for example, a triangular wave of FIG. 5, a trapezoidal wave of FIG. 6, and a rectangular wave of FIG. 7.

Figure 8:
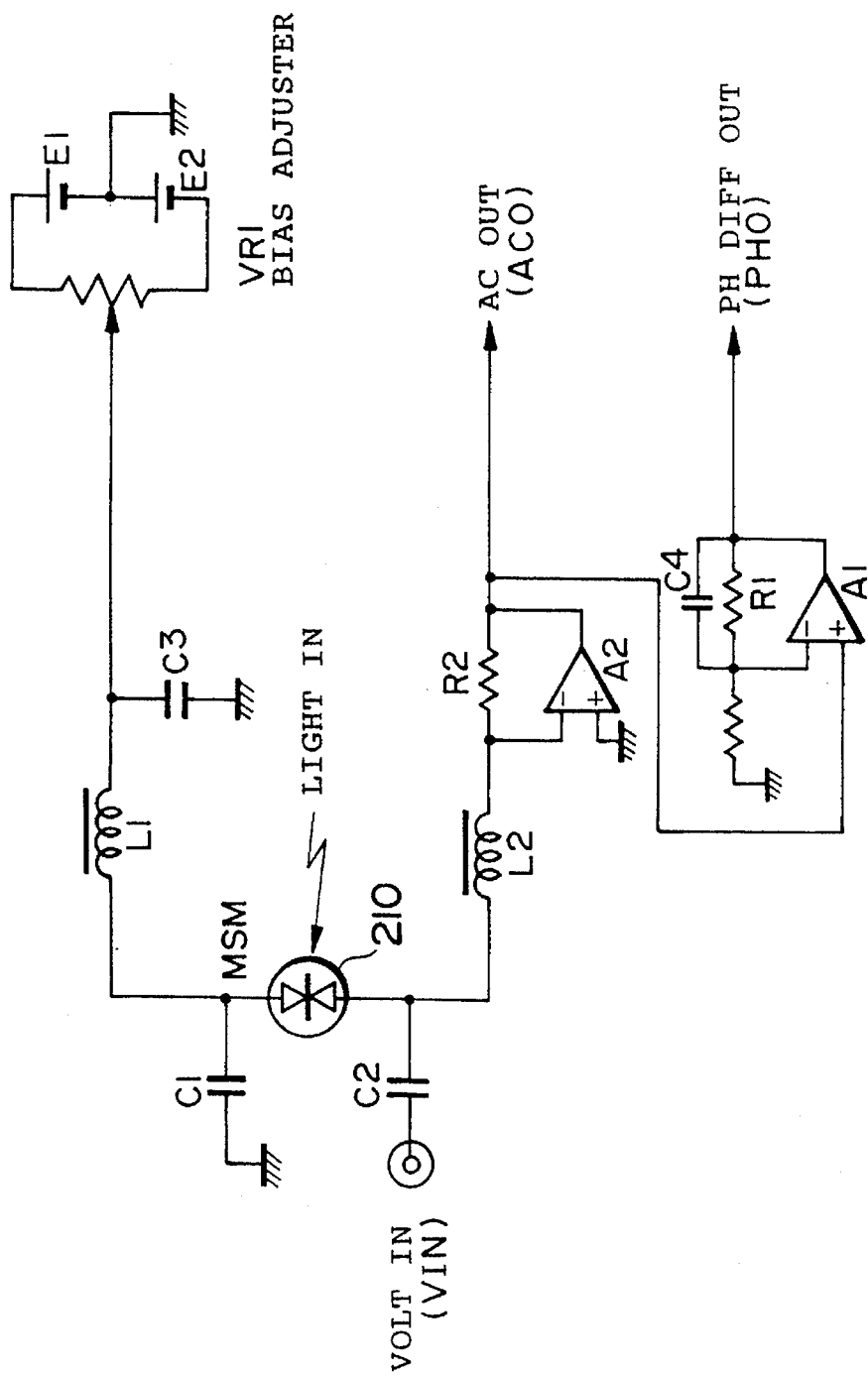
FIG. 8 is a structural drawing to show layout example 2 of the light-receiving portion.
Figure 9:
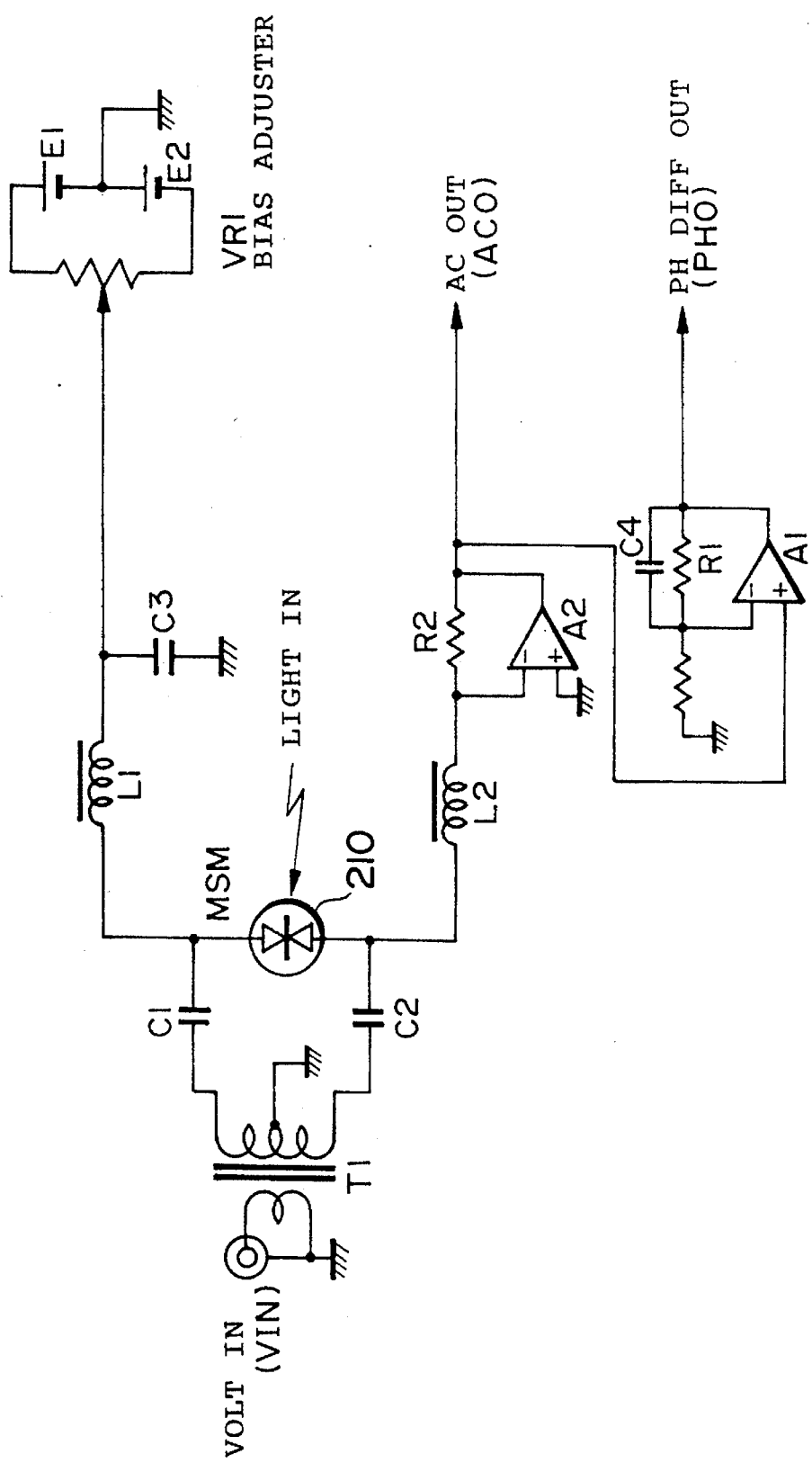
FIG. 9 is a structural drawing to show layout example 3 of the light-receiving portion.

The receiver 200 may be modified with regard to the method for applying the modulation signal in the structure of FIG. 3. For example, the receiver can be arranged as in layout example 2 of receiver shown in FIG. 8 or as in layout example 3 of receiver shown in FIG. 9, forming the same phase-locked loop.

Figure 10:
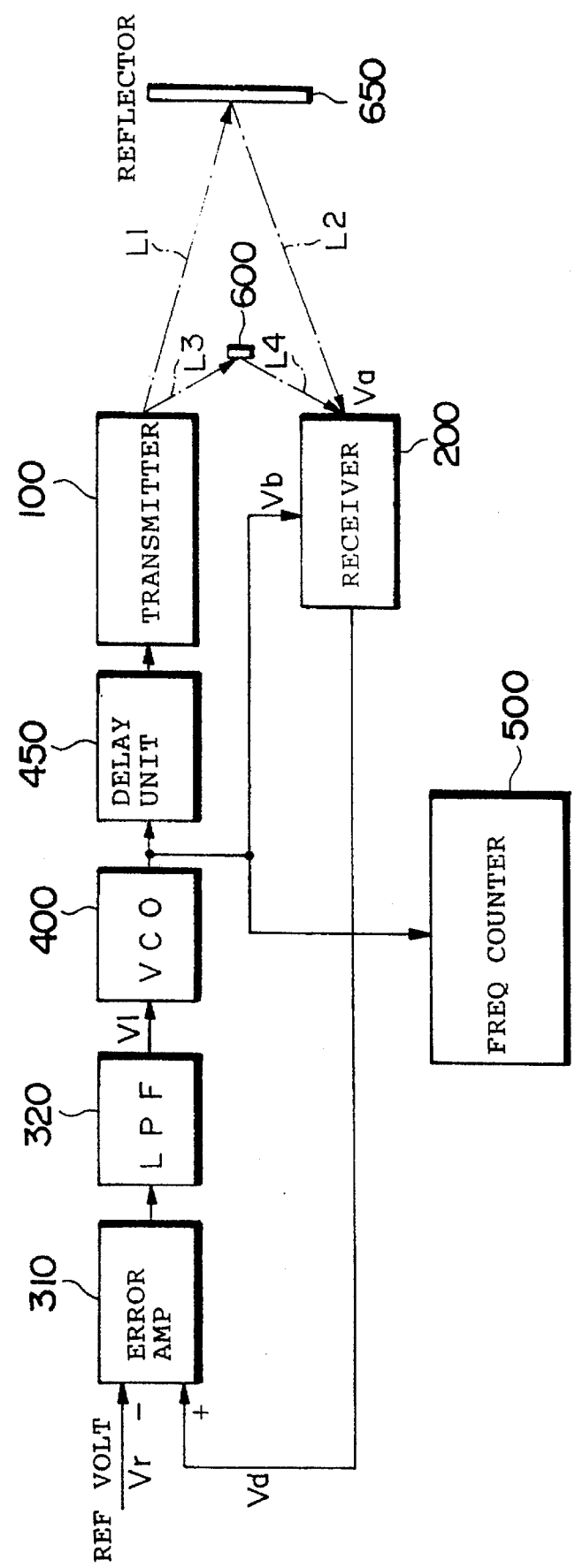
FIG. 10 is a structural drawing to show a schematic arrangement of an optical measuring apparatus of a second type according to the present invention.

FIG. 10 shows a schematic arrangement of an optical measuring apparatus of a second type, in which a reference optical path is provided. The reference optical path is for canceling a group delay change of a circuit system, which could become dominant in a drift of a measured value.

When a reference optical path L3, L4 is selected, the formula (6) can be modified as follows, considering the group delay of the circuit system.

$$Td_1 = 3/4 \cdot f_1^{-1} - Tc_1 \quad (11)$$

where
- $Td_1$: group delay time in L3, L4;
- $f_1$: VCO oscillation frequency;
- $Tc_1$: group delay time in the transmitter and the receiver.

When the measurement optical path L1, L2 to a reflector is selected, the group delay is as follows similarly.

$$Td_2 = 3/4 \cdot f_2^{-1} \cdot Tc_2 \quad (12)$$

where
- $Td_2$: group delay time in L1, L2;
- $f_2$: VCO oscillation frequency;
- $Tc_2$: group delay time in the transmitter and the receiver.

Measuring $Td_1$, $Td_2$ before a drift takes place, the following relation holds.

$$Tc_1 = Tc_2 = Tc \quad (13)$$

Then the following steps can provide a distance L to a measured object with respect to a reference point (distance of zero) of a reflecting plate 600 in the reference optical path without being affected by the group delay drift in the transmitter and the receiver.

Specifically, the following formula first holds.

$$Td = Td_2 - Td_1 = 3/4 \cdot (f_2^{-1} - f_1^{-1}) \quad (14)$$

Substituting this formula (14) into the formula (7), the distance L to the reflector is as follows under the assumption that the group index n of the substance filling the optical path is known.

$$L = 3/4 \cdot c \cdot (f_2^{-1} \cdot f_1^{-1})/(2 \cdot n) \quad (15)$$

If the distance L to the reflector is known, the group index n of the substance filling the optical path is as follows.

$$n = 3/4 \cdot c \cdot (f_2^{-1} \cdot f_1^{-1})/(2 \cdot L) \quad (16)$$

In the arrangement of FIG. 10, a delay unit 450 (delay time=$T_D$) is provided to widen the range of distance measurement without widening the oscillation frequency range of the VCO 400. The delay is included in $Tc_1$ of formula (11) and $Tc_2$ of formula (12).

For example, if a distance range of 0 to 100 m is measured without the delay unit 450 (that is, if $T_D=0$), modulation frequencies necessary for measurement of minimum and maximum distances are as follows:

(1) about 50 MHz for 0 m (where a sum of group delay times of the transmitter and the receiver is about 15 ns);

(2) about 1.1 MHz for 100 m (where a sum of delay times of the transmitter and the receiver is about 682

Thus, the VCO 400 needs an oscillation frequency range of about 1.1 MHz to 50 MHz. If the maximum value exceeds three times the minimum value of the modulation frequency used in distance measurement, it is possible that the above lock condition of the phase-locked loop is met by a plurality of modulation frequencies.

For such circumstances, a suitable delay unit may be set depending upon the measuring distance range, as in FIG. 10. For example, suppose a delay unit 450 of $T_D$=500 ns is set. For measurement in the above distance range of 0 to 100 m, modulation frequencies necessary for measurement of minimum and maximum distances are as follows:

(1) about 1.5 MHz for 0 m (where a sum of group delay times of the transmitter and the receiver is about 500 ns);

(2) about 643 kHz for 100 m (where a sum of delay times of the transmitter and the receiver is about 1.17 μs).

Thus, the maximum value of modulation frequency is lower than three times the minimum generated by the VCO 400. As described above, the delay unit 450 appropriately set according to the measuring distance range can uniquely determine the modulation frequency for phase lock and narrows the oscillation frequency range of VCO 400, which simplifies the construction of the apparatus.

Figure 11:
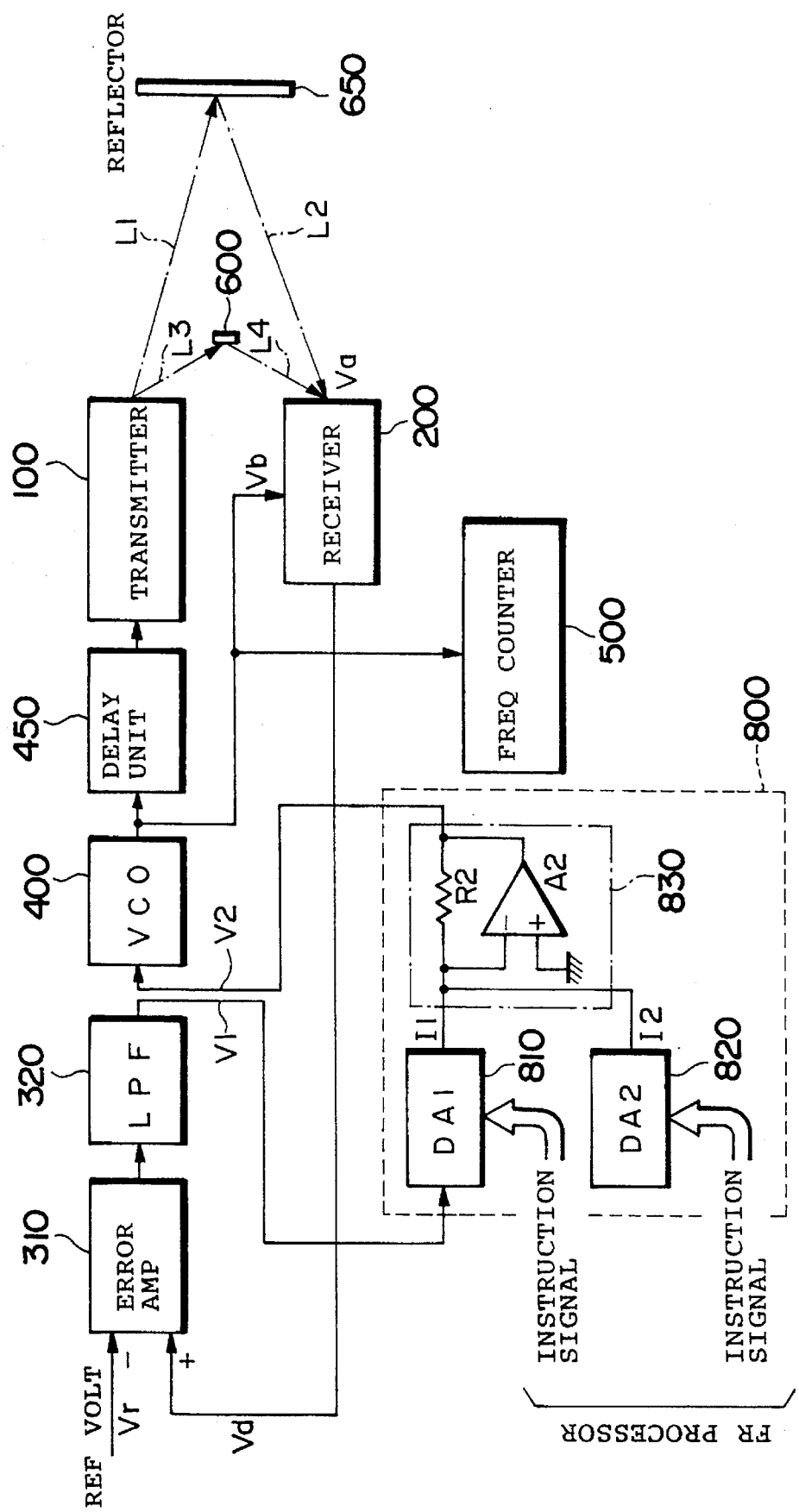
FIG. 11 is a structural drawing to show a schematic arrangement of an optical measuring apparatus of a third type according to the present invention.

FIG. 11 shows a schematic arrangement of an optical measuring apparatus of a third type, in which a reference optical path is provided and a modulation frequency changing portion 800 is provided between the low-pass filter 320 and the VC0 400. The modulation frequency changing portion 800 is for determining a number of waves of an intensity-modulated component with the modulation frequency existing in the optical path (L1+L2). As shown in FIG. 11, the modulation frequency changing portion 800 is composed of (1) a multiplication-type current-output D/A converter 810 (DA1) for receiving a near dc voltage signal V1 output from the low-pass filter 320 and a standard voltage instruction signal output from a processing unit (not shown) to output a near dc current signal I1 having a value according to a product between the value of V1 and the value of standard voltage, (2) a current-output D/A converter 820 (DA2) for receiving a displacement voltage instruction signal output from the processing unit to output a dc current signal I2 having a value according to a value of the displacement voltage instruction signal, and (3) a current adder 830 for receiving I1 and I2 to output a near dc voltage signal V2 according to a sum of the value of I1 and the value of I2.

Here, the current adder 830 is composed of an operational amplifier A2 connected to the ground at the positive input terminal, to outputs of the D/A converter 810 and D/A converter 820 at the negative input terminal, and to a voltage input terminal of the VCO 400 at the output terminal, and a resistor R2 connected to the output terminal of the operational amplifier A2 at one terminal and to the negative input terminal of the operational amplifier A2 at the other terminal to effect current-voltage conversion.

As detailed above, the optical measuring apparatus of the present invention are arranged to measure the distance or the group index of the substance filling the optical path (L1+L2) by detecting the value of phaselock modulation frequency, so that they can perform higher-accuracy measurement as the value of modulation frequency increases. However, the uniqueness of the phase-lock modulation frequency cannot be maintained with the increase of the phase-lock modulation frequency.

The apparatus of this type is thus so arranged that the standard voltage value from the processing unit is set in the D/A converter 810, whereby an output current value of D/A converter 820 is first adjusted at nearly 0 in the range of values of the modulation frequency where a sufficient measurement accuracy can be attained (for example, near $10^8$ Hz), and a first phase-lock modulation frequency value f1 is then measured. For the first modulation frequency value f1, the following relation holds.

$$m+3/4=f1\cdot(2L\cdot n/c+Td) \quad (17)$$

where m: wave number of modulation wave in the optical path (L1+L2);

2L: go-and-return distance to a reflector;

n: group index of a substance filling the optical path (L1+L2);

c: speed of light in vacuum;

Td: sum of group delay times of the transmitter, the receiver, and the delay unit.

At this stage, m, and L in case of a rangefinder or n in case of a group index meter are unknown, and, therefore, a value to be measured cannot be determined.

Next, the processing unit provides an increase instruction to increase the current output to the D/A converter 820. In this case, an amount of the current increase instructed by the processing unit is so set that an increment Δf of the modulation frequency changed by the current increase becomes approximately equal to a value of Δf1 calculated by the following formula.

$$\Delta f1=(2L_{MAX}/c+Td)^{-1} \quad (18)$$

where $L_{MAX}$: maximum of measured distance by the apparatus in case of distance measurement; or a set distance value in case of the group index measurement.

It is assumed above that n is approximately "1." If n cannot be assumed as "1" in measurement, "c" in the formula (18) is replaced by "$C/n_{MAX}$" where $n_{MAX}$ is a maximum of n to be expected.

The current output of the D/A converter 820 is thus increased by about Δf1 to measure the phase-lock frequency. If the value of measured phase-lock frequency becomes coincident with f1, the processing unit increases the current output of the D/A converter 820 every unit of about Δf1 while measuring the phase-lock frequency. This process is continued before the phase-lock frequency changes from f1. For a changed phase-lock frequency f2, the following relation holds.

$$m+1+3/4=f2\cdot(2L\cdot n/c+Td) \quad (19)$$

Solving the simultaneous equations of formula (17) and formula (19) for m, $$m=(7f1-3f2)/[4(f2-f1)] \quad (20).$$

Thus, m can be obtained from the measured values f1 and f2. Putting the value of m into the formula (17), the distance L or the group index n to be measured is calculated.

In the above example the D/A converters 810, 820 are of the current output type to perform the current addition, but D/A converters of a voltage output type may also be employed to perform voltage addition.

Specific embodiments of the present invention will be described.

First Embodiment

Figure 12:
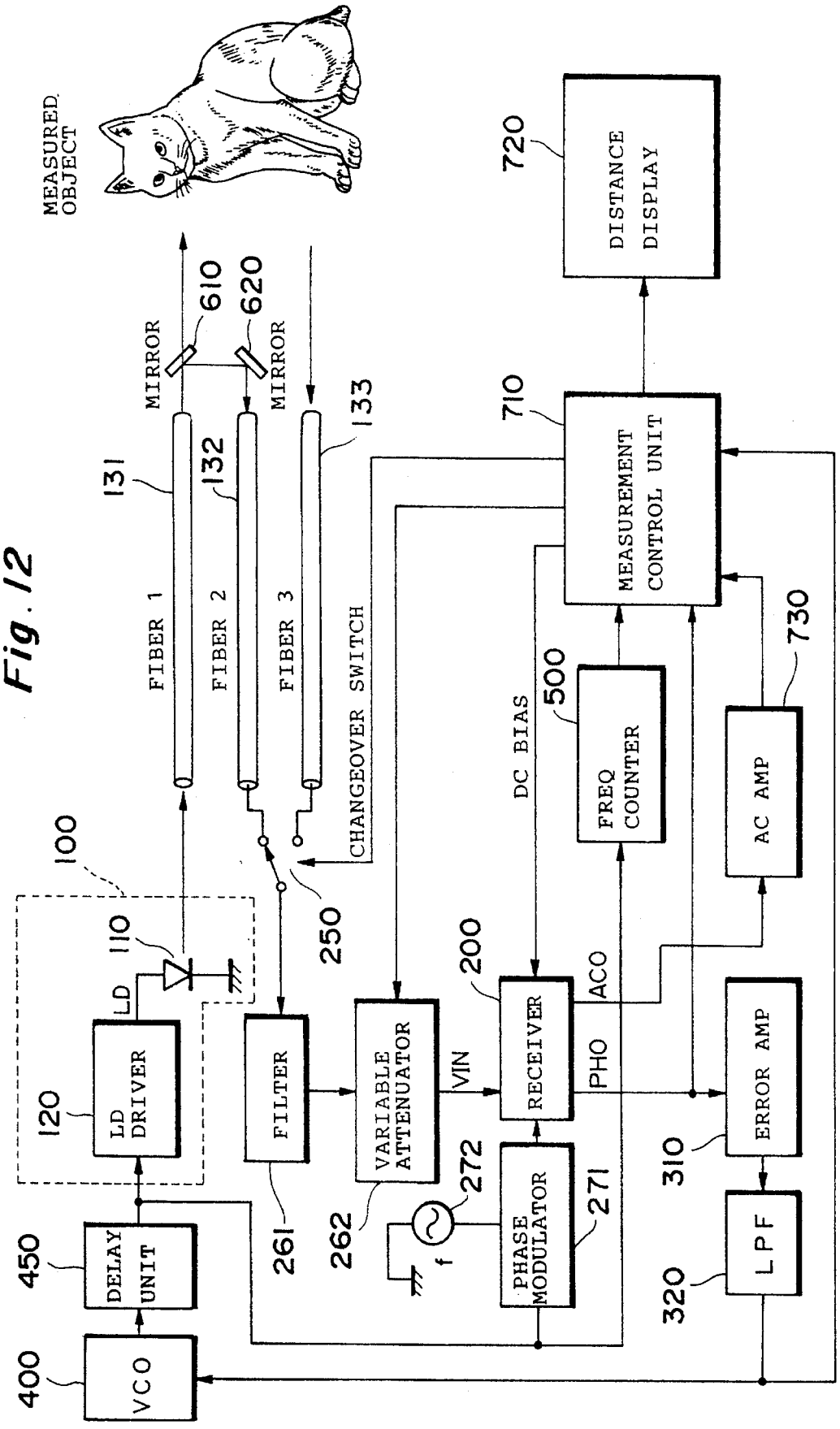
FIG. 12 is a structural drawing of an optical measuring apparatus of a first embodiment.

FIG. 12 shows an apparatus of a first embodiment of the present invention, in which the optical measuring apparatus of the second type shown in FIG. 10 is applied to a fiberscope. Laser light from a laser diode (LD) 110 is guided through a fiber 131 to be projected onto an object to be measured. The laser light is collimated in the form of a beam, so that it is focused at a point on the object. If the target object is far enough to spread the beam of laser light, a retroreflective reflector such as a corner cube prism is to be used as a target. Part of light outgoing the fiber 131 is guided via mirrors 610, 620 to a fiber 132 (calibration optical path).

On the other hand, scattered light from the object is guided to an optical filter 261 by changing over an optical switch 250 to select a fiber 133. The optical filter 261 is constructed of a spectroscope or an interference filter. The optical filter 261 is provided for removing disturbance components such as illumination light used in observing appearance of an object to be measured. Light having passed the optical filter 261 is supplied to a light-variable attenuator 262. The light-variable attenuator 262 is provided for preventing the saturation of the photoconductive receiver 210 in the receiver 200 in receiving an excessive amount of light due to differences in reflectivity of object and in distance. Specifically, the attenuator is constructed of a liquid crystal changing the transmittance with a change in applied voltage, PLZT, or a mechanical changeover mechanism of ND filter.

After the above processes, the intensity-modulated, scattered light or the return light from the calibration optical path enters the receiver 200. The receiver 200 calculates a product between the received signal and the modulation signal output from the VCO 400, as described previously, and performs the time average operation to extract the dc component.

In the present embodiment, a phase modulator 271 phase-modulates the modulation signal output from the VCO 400 with an oscillation signal of frequency f generated by an oscillator 272, and thereafter the modulated signal is supplied to the receiver 200. Since the frequency f is set to a value sufficiently larger than the band width of the loop filter in the above phase-locked loop, it does not affect the phase-lock characteristics. In the phase-locked state, the signal in the receiver 200 before being time averaged includes the ac component of frequency f. The signal is put through an ac amplifier 730 to a measurement control unit 710, whereby it can be determined whether a short of the receiving light quantity moves the lock phase to cause an error in distance measurement.

An output signal from the receiver 200 is fed through the error amplifier 310 and the low-pass filter 320 back to the VCO 400. The VCO 400 produces a modulation signal oscillating at a frequency according to a voltage value of the input signal and outputs it to an LD driver 120. The LD driver 120 converts the output from the VCO 400 into a current to supply it to LD 110. An output from the LD 110 is guided through the fiber 131 to the object to be measured or via the mirrors 610, 620 for calibration optical path to the fiber 132.

A part of the output from the receiver 200 is guided to the measurement control unit 710 in order to avoid a phase detection error due to a change of offset voltage. The measurement control unit 710 adjusts the offset voltage of the receiver 200 so that the output from the receiver 200 becomes "0 V" upon incidence of non-modulated light.

The measurement control unit 710 controls the optical path changeover switch and, for every changeover, reads a frequency to satisfy the phase-locking condition from the frequency counter 500 to calculate a distance to the measured object and to indicate a measured distance on a display 720.

The operation of the apparatus in the present embodiment is next described. The laser light from the LD 110 is guided through the fiber 131 to be projected onto the target object.

The receiver 200 detects a returning beam of the laser light reflected by the object. The dc output component from the receiver becomes zero under the condition that a phase difference between the laser light emitted from the LD 110 and the modulation signal output from the VCO 400 is $\pi/2$. Accordingly, when the output frequency of the VCO 400 is fixed as phase-locked, the output frequency is always one corresponding to the distance from LD 110 to the target object. Monitoring the output frequency of the VCO 400 by the frequency counter 500, the apparatus can obtain, based on an output frequency at a certain time, a distance to the object at the moment in a simple manner and with a high accuracy. If the measurement of the phase-lock frequency is also carried out selecting the fiber 133 by changing over the optical switch 250, a distance to the object can be attained with respect to the reference point of mirror 610 as removing a phase difference arising from the apparatus itself of the present embodiment.

Next described are specific measurement conditions in the first embodiment. Each fiber 131, 132, 133 has the length of 1.5 m and the group index of 1.5. The distance from the emission end of fiber 131 to the mirror 610 is 5 mm. The distance from the mirror 610 to the mirror 620 is 2.5 min. The distance from the mirror 620 to the fiber 132 is 2.5 min. The optical path to the target object has an average index of 1.0. A sum of group delay times of the transmitter 100 including LD 110, the receiver 200, and the amplifying unit is 5 ns. The speed of light in vacuum is $3 \times 10^8$ m/s. Under the above conditions, $f_1$ (value obtained when the measurement light is bypassed through the calibration optical path) is obtained as follows from formula (11).

$$\begin{aligned} f_1 &= 3/4 \cdot (Td_1 + Tc_1)^{-1} \\ &= 3/4 \cdot \{[2 \times 1.5 \times 1.5 + (5 + 2.5 + 2.5) \times \\ & \quad 10^{-3}]/3 \times 10^8 + 5 \times 10^{-9}\}^{-1} \\ &= 37.437605 \times 10^6 \end{aligned}$$

Then, assuming the distance between the mirror 610 and the object to be measured is 20 cm and the average index is 1.0, $f_2$ (value obtained when the measurement light is projected onto the measured object) is similarly obtained as follows.

$$\begin{aligned} f_2 &= 3/4 \cdot \{[2 \times 1.5 \times 1.5 + (5 + 5) \times \\ & \quad 10^{-3} + 2 \times 0.2]/3 \times 10^8 + 5 \times 10^{-9}\}^{-1} \\ &= 35.101404 \times 10^6 \end{aligned}$$

Assuming the accuracy for the frequency measurement is six figures ($\pm 1/1000000$), a maximum measurement error $\Delta L$ is calculated as follows from formula (13).

$$\Delta L = 0.000002 \times 3 \times (f_2^{-1} + f_1^{-1}) \times v_0/(2 \times 4) = 12.42 \ \mu m$$

In the above calculation, n=1. Here, let us consider a conventional electro-optical rangefinder of the phase-difference method using a modulation wave of 15 MHz. Assuming a phase resolution is 1/2000, a time resolution in the go-and-return path is as follows.

$$(15 \times 10^6)^{-1}/2000 = 33.3 \times 10^{-12}$$

This gives a distance of:

$$3 \times 10^8 \times 33.3 \times 10^{-12}/2 = 5 \ mm.$$

It is thus seen that the apparatus of the present embodiment can achieve a much higher resolution in a simple arrangement than that in measurement of phase itself.

Since the apparatus can accurately measure the distance to the measured object as described, it can also measure dimensions of the object from a field angle of the optical system. If such an apparatus of the present embodiment is incorporated in an endoscope, it is considered that an effective index can be supplied in determining an irradiation intensity of a laser for treatment of tumor using a laser beam. Also, a portable, simple rangefinder can be constructed.

Although the above fiberscope was described as an example utilizing the optical measuring apparatus of the second type, the optical measuring apparatus of the first type or the third type can also be applied thereto. It should be, however, noted that, utilizing the optical measuring apparatus of the first type, the measurement accuracy is lowered in the arrangement without modification as compared with the above fiberscope and, therefore, a group delay change of the circuit system intrinsic to the apparatus needs to be compensated by preliminarily measuring it. If the optical measuring apparatus of the third type is utilized, the measurement accuracy is improved but the structure of the apparatus becomes a little complex.

Second Embodiment

Figure 13:
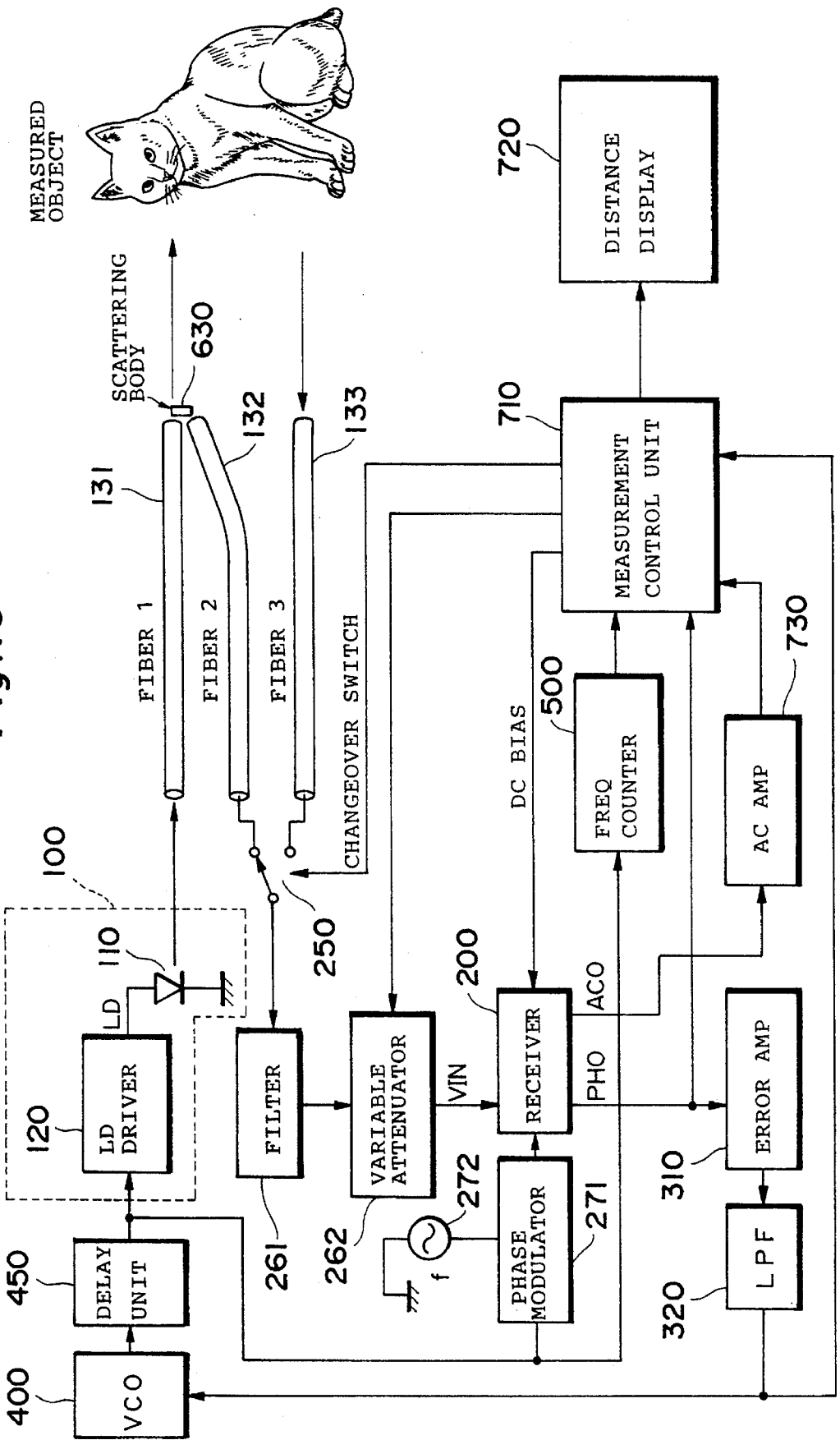
FIG. 13 is a structural drawing of an optical measuring apparatus of a second embodiment.

FIG. 13 shows an apparatus of a second embodiment of the present invention, in which the optical measuring apparatus of the second type shown in FIG. 10 is applied to a fiberscope. In the present embodiment, distal ends of fiber 131 and fiber 132 are set close to each other and a scattering body 630 is set at the distal ends to return part of light outgoing from the fiber 131 into the fiber 132. The distal ends of the fibers can be constructed in a small scale, and there is no need to take into consideration a distance between the fiber mirror 610 and the mirror 620 and the distance between the mirror 620 and the fiber 133 in the first embodiment of FIG. 12. Although the present embodiment is arranged with separate fibers of fiber 131 and fiber 132, they can be formed as a single fiber. In that case, reflection at the fiber end can be utilized without using the scattering body 630.

The present embodiment can also utilize the optical measuring apparatus of the first type or the third type, similarly as in the first embodiment. It should be, however, noted that, utilizing the optical measuring apparatus of the first type, the measurement accuracy is lowered in the arrangement without modification as compared with the above fiberscope and, therefore, a group delay change of the circuit system intrinsic to the apparatus needs to be compensated by preliminarily measuring it. If the optical measuring apparatus of the third type is utilized, the measurement accuracy is improved but the structure of the apparatus becomes a little complex.

Third Embodiment

Figure 14:
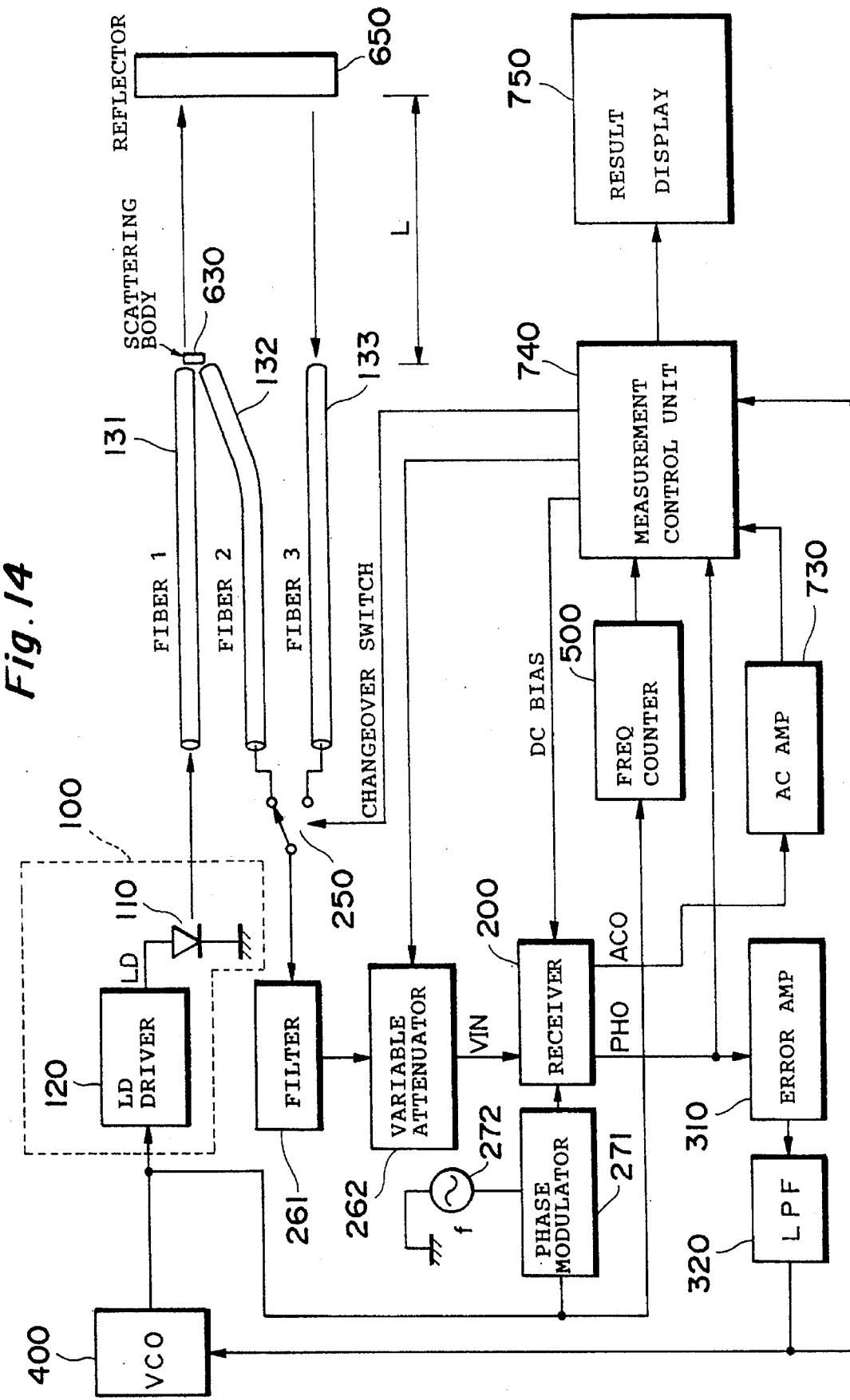
FIG. 14 is a structural drawing of an optical measuring apparatus of a third embodiment.

FIG. 14 shows an apparatus of a third embodiment of the present invention, in which the optical measuring apparatus of the second type shown in FIG. 10 is applied to a group index meter. The apparatus of the present embodiment is so arranged that a reflector 650, located at a predetermined distance L from the light exit end of fiber 131 and from the light entrance end of fiber 133, is added to the apparatus of the second embodiment. The processing unit 740 is so arranged that the built-in calculation function of the processing unit 710 in the second embodiment is modified into one for calculating the group index, and the display 750 indicates a value measured by the apparatus.

The operation of the apparatus in the present embodiment is next described. The laser light from the LD 110 is guided through the fiber 131 to be projected onto the target object. The receiver 200 detects a returning beam of the laser light reflected by the object. The dc output component from the receiver becomes zero under the condition that a phase difference between the laser light emitted from the LD 110 and the modulation signal output from the VCO 400 is $\pi/2$. Accordingly, when the output frequency of the VCO 400 is fixed as phase-locked, the output frequency is always one corresponding to the distance from LD 110 to the target object. Monitoring the output frequency of the VCO 400 by the frequency counter 500, the apparatus can obtain, based on an output frequency at a certain time, a group index of the substance filling the optical path in a simple manner and with a high accuracy. If the measurement of the phase-lock frequency is also carried out selecting the fiber 133 by changing over the optical switch 250, a group index of the substance filling the optical path can be attained as removing a phase difference arising from the apparatus itself of the present embodiment.

If in the apparatus the air fills the space between the receiver 200 and the reflector 650, the group index n as a measured value can be expressed by the following empirical formulas.

$$(n-1) \cdot 10^8 = [2371.4 + 683939.7 \cdot (130 - \sigma^2)/(130 - \sigma^2)^2 + \quad (21)$$

$$4547.3 \cdot (38.9 + \sigma^2)/(38.9 + \sigma^2)^2] \cdot D_S + [6487.31 +$$

$$174.174 \cdot \sigma^2 - 3.55750 \cdot \sigma^4 + 0.61957 \cdot \sigma^6] \cdot D_W$$

$$D_S = (P_S/T) \cdot [1 + P_S \cdot (57.90 \cdot 10^{-8} - 9.3250 \cdot 10^{-4}/T + 0.25844/T)] \quad (22)$$

$$D_W = (P_W/T) \cdot [1 + P_W \cdot (1 + (3.7 \cdot 10^{-4}) \cdot P_W) \cdot \quad (23)$$

$$(-2.37321 \cdot 10^{-3} + 2.23366/T - 710.792/T^2 + 7.75141 \cdot 10^4/T^3)]$$

In the above formulas, $P_S$: dry air pressure (hPa);

$P_W$: vapor pressure (hPa);

T: absolute temperature (° K);

$\sigma$: inverse of wavelength in vacuum ($\mu m^{-1}$).

(J. C. Owens, "Optical Refractive Index of Air: Dependence on Pressure, Temperature and Composition," Applied Optics 6 (1), 1967, pp 51–58) Therefore, if two values are known out of the temperature, the humidity, and the pressure, a remaining unknown atmospheric information value can be calculated using the group index n measured by this apparatus.

The present embodiment can also utilize the optical measuring apparatus of the first type or the third type, similarly as in the first embodiment. It should be, however, noted that, utilizing the optical measuring apparatus of the first type, the measurement accuracy is lowered in the arrangement without modification as compared with the above fiberscope and, therefore, a group delay change of the circuit system intrinsic to the apparatus needs to be compensated by preliminarily measuring it. If the optical measuring apparatus of the third type is utilized, the measurement accuracy is improved but the structure of the apparatus becomes a little complex.

It should be noted that the present invention is by no means limited to the above embodiments but can have various modifications. For example, the apparatus in the above embodiments may be so modified that the LD is replaced by LED for high-speed modulation. In order to avoid deterioration of measurement accuracy due to a drift of the transmitter, another receiver may be arranged to receive reflected light or direct light from the calibration optical path and an output from the receiver may be used as a voltage applied to the photoconductive receiver.

As detailed above, the first optical measuring apparatus of the present invention is so arranged that the light-receiving portion having the photoconductive receiver directly calculates a difference between the phase of the modulation signal of the transmitter and the phase of the reflected, modulated light in the receiver and that the apparatus performs a control to adjust the frequency of the modulated light so as to keep the phaselock condition using the calculation results, whereby the frequency of the modulation signal always corresponds to the distance from the transmitter and receiver to the target object. Therefore, when the frequency is fixed, the distance to the target object at the moment can be determined in a simple manner and with a high accuracy, based on the frequency of the modulated light at the moment.

Further, the second optical measuring apparatus of the present invention is so arranged that a light-receiving portion having the photoconductive receiver directly calculates a difference between the phase of the modulation signal of the transmitter and the phase of the reflected, modulated light in the receiver and that the apparatus performs a control to adjust the frequency of the modulated light so as to keep the phase-lock condition using the calculation result, whereby the frequency of the modulation signal always corresponds to the group index of the substance filling the optical path from the transmitter and receiver to the reflecting means set at a predetermined position. Accordingly, when the frequency is fixed, the group index of the substance filling the optical path to the reflecting means at the moment can be determined in a simple manner and with high accuracy, based on the frequency of the modulated light at the moment.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No. 214199/1993 filed on Aug. 30, 1993 is hereby incorporated by reference.

What is claimed is:

1. An optical measuring apparatus, comprising:

a light-transmitting portion for projecting light subjected to intensity modulation according to a modulation signal toward a target object;

a photoconductive light-receiving element for receiving said modulation signal and light reflected by said target object said photoconductive light-receiving element directly calculating a product between said reflected light and said modulation signal and outputting a signal according to a value of a phase difference between said reflected light and said modulation signal;

time-averaging means for receiving said output signal from said photoconductive light-receiving element and calculating a time averaged value of said output signal;

frequency adjusting means for adjusting a frequency of said modulated light so as to keep an output signal from said photoconductive light-receiving element fixed at a reference value;

frequency counting means for counting a fixed modulation frequency as adjusted by said frequency adjusting means; and processing means for obtaining a characteristic value of an optical path from said light-transmitting portion and said photoconductive light-receiving element to the target object, based on the frequency counted by said frequency counting means.

2. An optical measuring apparatus according to claim 1, wherein said characteristic value is a distance of the optical path from said light-transmitting portion and photoconductive light-receiving element to the target object.

3. An optical measuring apparatus according to claim 1, wherein said characteristic value is a group index of the optical path from said light-transmitting portion and photoconductive light-receiving element to the target object.

4. An optical measuring apparatus according to claim 1, further comprising a calibration bypass optical path for removing a phase difference intrinsic to the optical measuring apparatus itself.

5. An optical measuring apparatus according to claim 1, further comprising a delay unit between said frequency adjusting means and said light-transmitting portion.

6. An optical measuring apparatus according to claim 1, wherein said photoconductive light-receiving element is so arranged that if a quantity of the projected light is constant and a value of applied voltage is an independent variable, an amount of a current flowing in said photoconductive receiver is an odd function of the applied voltage in a predetermined definition area including the value of applied voltage being 0 V, and that the applied voltage is periodic, a value of time average thereof is approximately 0, and an amplitude thereof is an even function of time with the origin at a time of an intermediate point between two adjacent times having an amplitude of 0.

7. An optical measuring apparatus according to claim 6, wherein said photoconductive light-receiving element is a metal-semiconductor-metal photodetector.

8. An optical measuring apparatus according to claim 1, wherein said photoconductive light-receiving element further comprises:

adjusting means for adjusting an offset voltage of said photoconductive light-receiving element.

9. An optical measuring apparatus according to claim 8, wherein said photoconductive receiver is so arranged that if a quantity of the projected light is constant and a value of applied voltage is an independent variable, an amount of a current flowing in said photoconductive receiver is an odd function of the applied voltage in a predetermined definition area including the value of applied voltage being 0 V, and that the applied voltage is periodic, a value of time average thereof is approximately 0, and an amplitude thereof is an even function of time with the origin at a time of an intermediate point between two adjacent times having an amplitude of 0.

10. An optical measuring apparatus according to claim 9, wherein said photoconductive light-receiving element is a metal-semiconductor-metal photodetector.

11. An optical measuring apparatus according to claim 1, wherein said voltage signal is produced by phase-modulating said modulation signal with another modulation signal.

12. An optical measuring apparatus according to claim 1, wherein said frequency adjusting means comprises:

an error amplifier for receiving a reference voltage and an output signal from said photoconductive light-receiving element, amplifying a value of a difference between a value of said reference voltage and a value of the output signal from said photoconductive light-receiving element, and outputting an amplified voltage signal;

a low-pass filter for receiving said amplified voltage signal, reducing an ac component, and outputting a near dc voltage signal; and a voltage control oscillator for receiving said near dc voltage signal, producing an electric signal of a frequency according to a value of said voltage signal, and outputting said electric signal to said light-transmitting portion.

13. An optical measuring apparatus according to claim 1, wherein said frequency adjusting means comprises:

an error amplifier for receiving a reference voltage and an output signal from said photoconductive light-receiving element, amplifying a value of a difference between a value of said reference voltage and a value of the output signal from said photoconductive light-receiving element, and outputting an amplified voltage signal;

a low-pass filter for receiving said amplified voltage signal, reducing an ac component, and outputting a first near dc voltage signal;

first signal converting means for receiving said first near dc voltage signal and a voltage range instruction signal, and outputting a first near dc electric signal having a value according to a value of a product between a value of said first near dc voltage signal and a value of said voltage range;

second signal converting means for receiving a displacement voltage instruction signal and outputting a second near dc electric signal having a value according to a value of said displacement voltage instruction signal;

signal adding means for receiving said first near dc electric signal and said second near dc electric signal and outputting a second near dc voltage signal according to a value of a sum between a value of said first near dc electric signal and a value of said second near dc electric signal; and a voltage control oscillator for receiving said second near dc voltage signal output from said signal adding means, producing a signal of a frequency according to a value of said voltage signal, and outputting said signal to said photoconductive light-transmitting element.

* * * * *